(12) United States Patent
Yorinobu et al.

(10) Patent No.: US 8,072,188 B2
(45) Date of Patent: Dec. 6, 2011

(54) POWER SUPPLY DEVICE FOR CHARGE/DISCHARGE DEVICE, AND CHARGE/DISCHARGE DEVICE

(75) Inventors: Masanori Yorinobu, Osaka (JP); Shigeru Okamoto, Osaka (JP); Hajime Katsushima, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 744 days.

(21) Appl. No.: 12/234,762

(22) Filed: Sep. 22, 2008

(65) Prior Publication Data

US 2009/0237028 A1    Sep. 24, 2009

(30) Foreign Application Priority Data

Mar. 19, 2008 (JP) ................................. 2008-070591

(51) Int. Cl.
  H02J 7/04 (2006.01)
  H02J 7/16 (2006.01)
  H02J 7/00 (2006.01)
  G01N 27/42 (2006.01)
  G01N 27/416 (2006.01)

(52) U.S. Cl. ........ 320/141; 320/139; 320/132; 320/137; 320/140; 324/425; 324/426

(58) Field of Classification Search ................. 320/141, 320/139
See application file for complete search history.

(56) References Cited

U.S. PATENT DOCUMENTS

| 6,184,660 | B1* | 2/2001 | Hatular .......................... 320/141 |
| 6,791,298 | B2* | 9/2004 | Shenai et al. .................. 320/128 |
| 2005/0135132 | A1* | 6/2005 | Masuda ........................ 363/142 |
| 2006/0033483 | A1 | 2/2006 | Wu |
| 2006/0244420 | A1* | 11/2006 | Stanesti et al. ................. 320/128 |

FOREIGN PATENT DOCUMENTS

| JP | 2000-262072 | 9/2000 |
| JP | 2002-010502 | 1/2002 |
| JP | 2002-335679 | 11/2002 |

* cited by examiner

Primary Examiner — Edward Tso
Assistant Examiner — Ahmed Omar
(74) Attorney, Agent, or Firm — Renner, Otto, Boisselle & Sklar, LLP

(57) ABSTRACT

This power supply device includes a series circuit of a first switching element and a second switching element connected in parallel with a DC power supply unit, and a smoothing filter circuit which includes a series circuit of an inductor and a smoothing capacitor connected in parallel with the second switching element. The power supply device also includes a control unit and a drive circuit for generating first and second PWM pulses by respectively driving the first and second switching elements ON and OFF, and for creating a dead time between those switching pulse signals. And this control unit changes the frequency of the switching pulse signal according to the pulse width of either the first PWM pulses or the second PWM pulses.

18 Claims, 9 Drawing Sheets

POWER SUPPLY DEVICE FOR CHARGE/DISCHARGE DEVICE, AND CHARGE/DISCHARGE DEVICE

CROSS REFERENCE

This Nonprovisional application claims priority under 35 U.S.C. §119(a) on Patent Application No. 2008-070591 filed in Japan on Mar. 19, 2008, the entire contents of which are hereby incorporated by reference.

BACKGROUND OF THE INVENTION

The present invention relates to a charge/discharge device, and to a power supply device for a charge/discharge device or the like. In particular, it relates to a power supply device, to the output terminals of which a secondary battery is connected, and which is adapted for performing testing of the battery characteristics (the electrical discharge characteristic and the capacity and so on) of this secondary battery by repeatedly performing charge and discharge thereof.

In the testing of a secondary battery such as a lithium ion battery or the like, normally, testing is performed by repeatedly charging and discharging the secondary battery by connecting it as a test subject to output terminals. For example control may be performed so as, when the battery voltage of the secondary battery is low, to establish a charge mode and flow a charging current into the secondary battery, and so as, when the battery voltage of the secondary battery is sufficiently high, to establish a discharge mode and flow a discharge current out of the secondary battery.

With this type of power supply device, a DC power supply unit is connected to the input side, and during the charge mode a charging current flows from the DC power supply unit to the secondary battery, while during the discharge mode a discharge current flows from the secondary battery to the DC power supply unit. Moreover, a series circuit of a first switching element and a second switching element is connected in parallel to the DC power supply unit, and a smoothing filter circuit, which comprises a series circuit of an inductor and a smoothing capacitor, is connected in parallel to said second switching element.

Furthermore, there is also provided a drive circuit which generates first PWM pulses and second PWM pulses for respectively turning said first switching element and said second switching element alternatingly ON and OFF, and which also generates a dead time between those PWM pulses (for example, refer to Japanese Laid-Open Patent Publication 2002-10502).

The power supply device having the above structure operates as follows.

When a secondary battery which is not charged is connected to the output terminals, the pulse width of the first PWM pulses becomes longer than the pulse width of the second PWM pulses, and the average voltage between the two ends of the second switching element becomes higher than the battery voltage of the secondary battery. Due to the difference between this average voltage and the battery voltage of the secondary battery, a charging current flows into the secondary battery.

In this charge mode, the charging current (i.e. the output current) is detected by an output current detection unit, and the duty ratios of the first PWM pulses and the second PWM pulses are controlled so that this current is kept at a constant value. Furthermore, a dead time is generated so that said first switching element and said second switching element are not turned ON at the same time, and thus the first PWM pulses and the second PWM pulses are not both turned ON together.

When the voltage of the secondary battery becomes sufficiently high, the system changes over to the discharge mode. In this discharge mode, the pulse width of the second PWM pulses becomes longer than the pulse width of the first PWM pulses, and the average voltage between the two ends of the second switching element becomes lower than the battery voltage of the secondary battery. Due to the difference between this average voltage and the battery voltage of the secondary battery, a charging current flows from the secondary battery towards the DC power supply unit.

In this discharge mode, the discharge current is detected by the output current detection unit, and the duty ratios of the first PWM pulses and the second PWM pulses are controlled so that this current is kept at a constant value. Furthermore, the dead time is set so that said first switching element and said second switching element are not turned ON at the same time, and thus both the first PWM pulses and the second PWM pulses are not both turned ON together.

By doing this, charging and discharging of the secondary battery are repeated, and capacity testing and other types of testing of the secondary battery may be performed.

With the power supply device described above, according to the progress of charging or discharging, the pulse widths (i.e. the ON widths) of the first PWM pulses and the second PWM pulses, or the OFF widths of these pulses, are gradually narrowed down progressively. For example, in the discharge mode, when discharge of the battery progresses and the battery voltage becomes low, control is exerted so that the OFF width of the second PWM pulses becomes shorter, in order to turn the second switching element ON for a greater proportion of the time.

However, when the dead time between the first PWM pulses and the second PWM pulses is formed by a circuit which includes a CR time constant circuit which can be built at low cost, the following problem arises.

That is, such a CR time constant circuit is a circuit which creates a delay by taking the edge off the pulse waveform, but, due to the analog signal processing, in a control state in which the OFF width of the second PWM pulses becomes shorter, the formation of these second PWM pulses becomes unreliable, and this control becomes unstable, which is undesirable. Even if, alternatively, the dead time is created by performing the waveform processing in an analog manner, the same problem arises. On the other hand if, in order to solve this problem, the first PWM pulses are formed perfectly in a digital manner, then the drive circuit for creating the dead time becomes a high price digital circuit, and a DSP or a CPU of high performance and high cost becomes necessary for forming the switching pulses, so that an overall increase of the cost of the power supply device is entailed.

The above describe type of problem also occurs in a similar manner in the charge mode as well. Furthermore, even if this power supply device is made to function as an electronic load device which can vary the magnitude of the load from the point of view of a secondary battery which is connected to its output terminals, the same types of problem as described above still occur.

Thus, the object of the present invention is to provide a power supply device for a charge/discharge device or the like, which is capable of preventing control becoming unstable in a state in which control is being exerted so that the pulse width of the first PWM pulses or the pulse width of the second PWM pulses becomes short, even without providing a high cost digital circuit or the like to the drive circuit.

SUMMARY OF THE INVENTION

The power supply device of the present invention comprises a series circuit of a first switching element and a second switching element, connected in parallel with a DC power supply unit, and a smoothing filter circuit comprising a series circuit of an inductor and a smoothing capacitor, connected in parallel with said second switching element. Moreover, the power supply device of the present invention also comprises output terminals which are connected to the two sides of said smoothing capacitor, a control unit which outputs a switching pulse signal, and controls the duty ratio thereof, and a drive circuit which, based upon said switching pulse signal, generates first PWM pulses and second PWM pulses for turning said first switching element and said second switching element alternatingly ON and OFF respectively, and which moreover creates a dead time between these PWM pulses.

And the control unit changes the frequency of said switching pulse signal corresponding to the pulse width of either said first PWM pulses or said second PWM pulses. It should be understood that, in this description of the present invention, by the pulse width, is meant either the ON width of the pulses or the OFF width of the pulses. Hereinafter, for the convenience of explanation, when simply the term "pulse width" is used, this may mean either the pulse ON width or the pulse OFF width. Moreover, the abovementioned ON width or OFF width refers to the ON section of the pulses or to their OFF section, respectively.

As one example of the power supply device of the present invention, a secondary battery is connected to the output terminals, and charging and discharging of this secondary battery are repeatedly performed, so that the secondary battery is tested. In other words, the power supply device of the present invention may, for example, be used as a test device for such a secondary battery.

With such a power supply device which is used as a test device for a secondary battery, the first switching element and the second switching element are turned alternatingly ON and OFF by the first PWM pulses and the second PWM pulses respectively. Moreover, a charging current flows to the secondary battery via the smoothing filter circuit which is connected in parallel to the second switching element, or a discharge current flows from the secondary battery to the DC power supply unit via the smoothing filter circuit.

When the pulse width of the first PWM pulses is longer than the pulse width of the second PWM pulses, then the system goes into the charge mode, and a charging current flows into the secondary battery. In other words, when the pulse width of the first PWM pulses is longer than the pulse width of the second PWM pulses, then, since the average voltage between the two ends of the second switching element is higher than the battery voltage of the secondary battery, accordingly a charging current flows into the secondary battery. Moreover, when the pulse width of the first PWM pulses is shorter than the pulse width of the second PWM pulses, then the system goes into the discharge mode, and a discharge current flows from the secondary battery to the DC power supply unit. In other words, when the pulse width of the first PWM pulses is shorter than the pulse width of the second PWM pulses, then, since the average voltage between the two ends of the second switching element is lower than the battery voltage of the secondary battery, accordingly a discharge current flows from the secondary battery to the DC power supply unit. In this manner, it is possible to perform charging and discharging of the secondary battery.

In the discharge mode, when the battery voltage of the secondary battery decreases, the OFF width of the second PWM pulses becomes shorter in correspondence thereto. Thus, with the present invention, the frequency of the switching pulses which create the first PWM pulses and the second PWM pulses is reduced in correspondence to decrease of the battery voltage of the secondary battery (i.e. in correspondence to shortening of the OFF width of the second PWM pulses). If a CR time constant circuit which forms the second PWM pulses by taking the edge off the switching pulses is employed, then, when the OFF width of the second PWM pulses becomes less than some constant width, the formation of these pulses becomes unreliable and the control of the second switching element becomes unstable. However since, with the present invention, the frequency of the switching pulses is reduced during this type of state, accordingly it becomes possible to form the second PWM pulses with good reliability.

Moreover, at the same time, it is also possible to prevent pulse loss occurring due to the first PWM pulses becoming unstable, as in the case of one line (a very narrow pulse width), so called "bearding".

The control unit may control the frequency of the switching pulses so that it becomes lower when the OFF width of the second PWM pulses becomes less than some constant pulse width, or may control the frequency of the switching pulses continuously according to shortening of the OFF width of the second PWM pulses.

It should be understood that while, in the charge mode, the OFF width of the first PWM pulses becomes shorter as the charging progresses, in this mode as well, it would be acceptable to perform control so as to reduce the frequency of the switching pulses when the OFF width of the first PWM pulses becomes shorter than a fixed pulse width, or alternatively it would also be acceptable to reduce the frequency of the switching pulses continuously according to increase of the voltage of the secondary battery (i.e. according to the OFF width of the first PWM pulses becoming shorter). By performing control during the charge mode as described above, it becomes possible to perform stable charging control, even if the power supply voltage of the DC power supply unit is low.

DETAILED DESCRIPTION OF THE INVENTION

Figure 1:
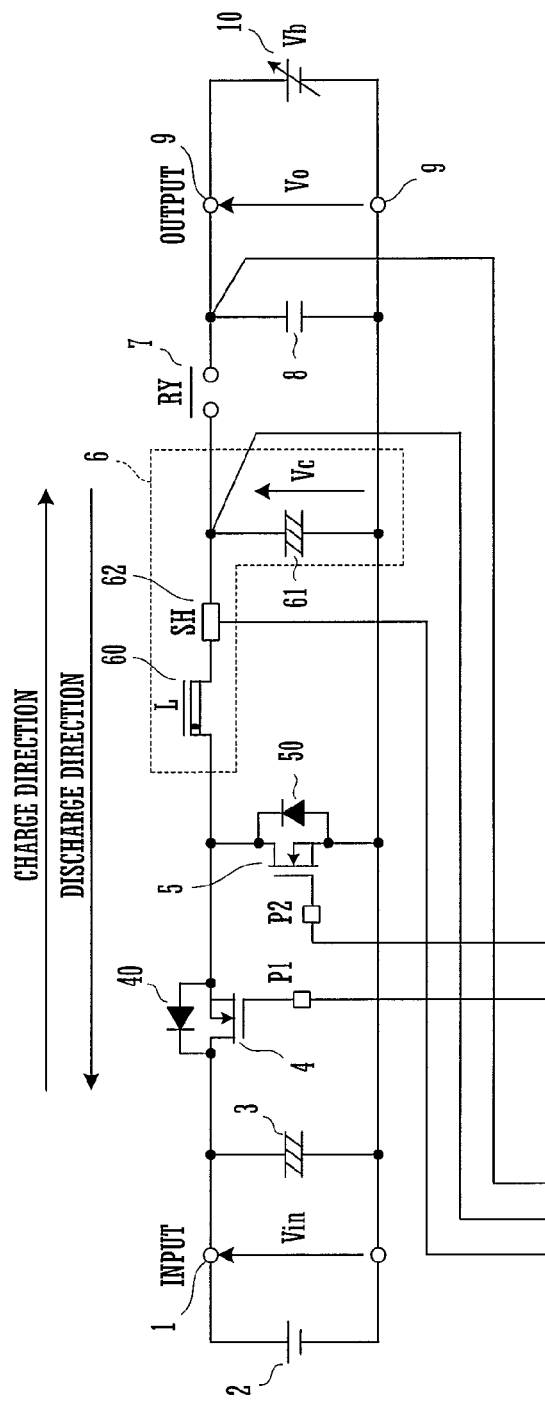
FIG. 1 is a block diagram of a charge/discharge device which is an embodiment of the present invention.

FIG. 1 is a block diagram of a charge/discharge device which is an embodiment of the present invention.

This charge/discharge device is used as a test device for testing the characteristics of a secondary battery by repeatedly charging and discharging that secondary battery.

A DC power supply unit 2 is connected to input terminals 1. Provided that its output voltage is a DC voltage, this DC power supply unit 2 may comprise a battery or an AC-DC converter or the like.

To the input terminals 1 there are connected in parallel a first smoothing capacitor 3 and a series circuit comprising a first switching element 4 and a second switching element 5. By "connected in parallel" is meant being directly or indirectly electrically connected in parallel between the input terminals 1, and includes both being connected in parallel without the interposition of any element or circuit, and being connected in parallel via some element or circuit.

Each of the first switching element 4 and the second switching element 5 may comprise a MOS type FET switching transistor or an IGBT (Insulated Gate Bipolar Transistor). However, these switching elements 4 and 5 may also comprise bipolar transistor elements or thyristor elements or the like.

A smoothing filter circuit 6 consisting of a series circuit of an inductor (L) 60 and a second smoothing capacitor 61 is connected in parallel with the second switching element 5. Moreover, to the output side of the inductor 60 there is connected an output current detection unit (SH) 62 which comprises a hollow coil or a Hall element or the like, and which detects the output current.

A capacitor 8 is connected in parallel with the smoothing capacitor 61 via an opening/closing element (RY) 7, and output terminals 9 are also connected thereto. A secondary battery 10, which is the subject for being tested, is connected to the output terminals 9. This secondary battery 10 may be, for example, a lithium ion battery whose battery voltage drops abruptly at a threshold state of discharge.

A control unit 11 generates a switching pulse signal W1 for alternately switching the first switching element 4 and the second switching element 5. This control unit 11 comprises a DSP (Digital Signal Processor), and generates the switching pulse signal W1 at high speed.

The output current Io detected by the output current detection unit 62, the smoothed output voltage Vc which is the voltage between the two ends of the smoothing capacitor 61, and the output voltage Vo which is the voltage across the output terminals 9, are all inputted to the input side of the control unit 11. Furthermore, the input side of the control unit 11 is provided with a communication terminal (SPI) for communicating with a higher level control device 15. An operation command signal, an operation stop signal, and a current command value are inputted from the higher level control device 15 to this communication terminal (SPI), and moreover answerback signals and the like specifying the state of this charge/discharge device are outputted from this communication terminal (SPI) to the higher level control device 15.

From the output side of the control unit 11, the switching pulse signal W1 which is PWM controlled is outputted from an output terminal (PWMO). After an operation command signal has been received from the higher level control device 15, this switching pulse signal W1 is PWM controlled, in other words is duty ratio controlled (constant current controlled) so that the output current Io which is detected by the output current detection unit 62 attains the current command value. Furthermore, as will be described hereinafter, in a discharge mode, in response to decrease of the battery voltage, the control unit 11 performs control to reduce the frequency f of the switching pulse signal W1.

The switching pulse signal W1 which is outputted from the output terminal (PWMO) is directly inputted to the first drive circuit 14, and is inputted to the second drive circuit 13 via a signal inversion circuit (an inverter) 12.

The second drive circuit 13 comprises an AND gate 13A, signal inversion circuits (inverters) 13B and 13C, and a second CR time constant circuit 13D. The second CR time constant circuit 13D delays the output signal of the AND gate 13A in an analog manner with a signal delay circuit which comprises a resistor R and a capacitor C. It should be understood that a diode D is connected in parallel with the resistor R in the opposite direction, thus ensuring that the electric charge stored in the capacitor C can be rapidly discharged. The output of this second CR time constant circuit 13D is inputted to the signal inversion circuit 13B, and moreover the output thereof is inputted to the signal inversion circuit 13C. And the output of the second drive circuit 13 is outputted at the gate terminal of the second switching element 5 as a second PWM pulse.

It should be understood that the AND gate 13A and the signal inversion circuits 12, 13B, and 13C generate a small delay in the signal, due to their hysteresis characteristics. Furthermore, the signal inversion circuit 13D operates as a waveform shaping circuit which shapes the signal which has been blunted by the second CR time constant circuit 13D into a pulse signal.

The first drive circuit 14 has the same circuit structure as the second drive circuit 13. However, the time constant of the first CR time constant circuit 14D which is provided within that circuit 14 is different from the time constant of the second CR time constant circuit 13D which is provided within the second drive circuit 13. The output of the first drive circuit 14 is outputted to the gate terminal of the first switching element 4 as a first PWM pulse.

By making the time constants of the CR time constant circuits 13D and 14D, which are respectively provided within the first drive circuit 14 and the second drive circuit 13, different in this manner, a dead time is created between the first PWM pulse P1 and the second PWM pulse P2.

It should be understood that, although diodes (free wheel diodes) 40 and 50 are connected in parallel to the first switching element 4 and the second switching element 5, these are elements for discharging the energy which is accumulated in the inductor 60 when the switching element 4 or 5 is OFF. In other words, during the charge mode, when the first switching element 4 is OFF, the energy which is accumulated in the inductor 60 is discharged through the diode 50 (actually, in any interval other than the dead time, it is discharged through the second switching element 5, since this switching element 5 is ON). Similarly, during the discharge mode, when the second switching element 5 is OFF, the energy which is accumulated in the inductor 60 is discharged through the diode 40 (actually, in any interval other than the dead time, it is discharged through the first switching element 4, since this switching element 4 is ON).

The testing of the secondary battery 10 is performed as will now be described.

First, a secondary battery 10 which is not charged is connected to the output terminals 9, and the charge/discharge device is started.

At this time, the system goes into the charge mode, since the average voltage between the two ends of the second switching element 5 is higher than the battery voltage of the secondary battery 10. In the charge mode, the pulse width of the first PWM pulse P1 (its ON width) becomes greater than the pulse width of the second PWM pulse P2 (its ON width).

Figure 2:
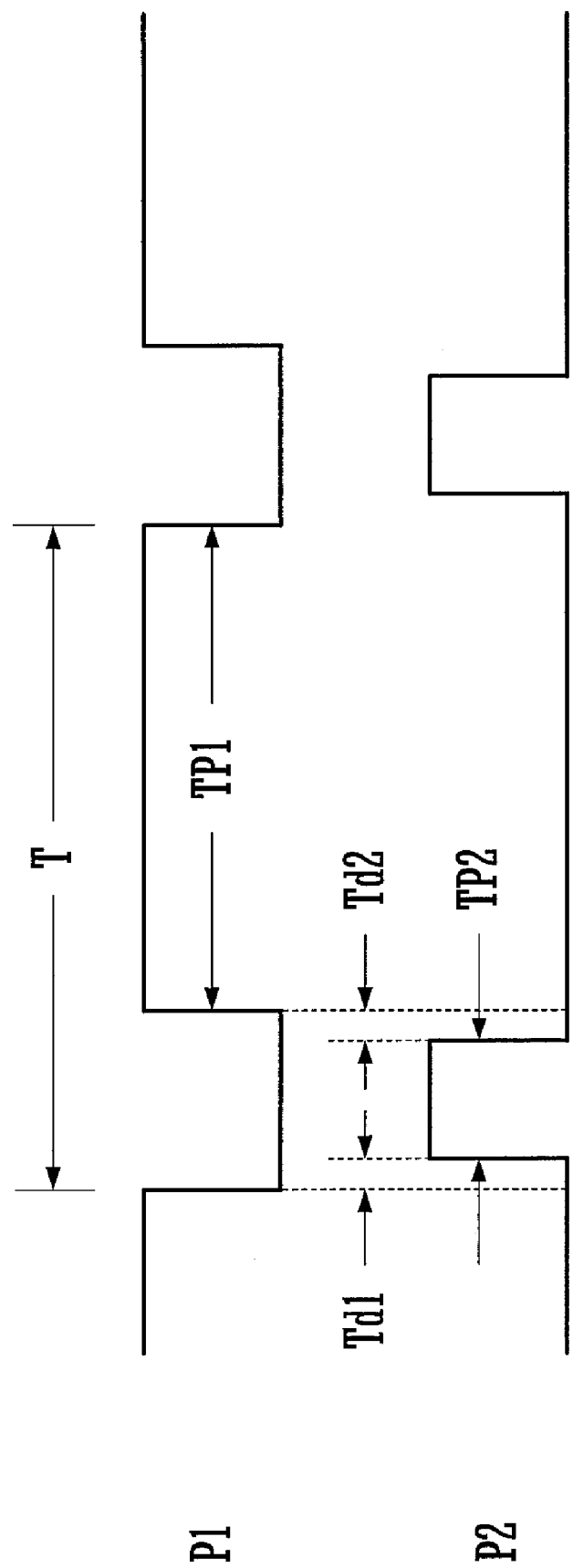
FIG. 2 shows a first PWM pulse P1 and a second PWM pulse P2 during a charge mode.

FIG. 2 shows the first PWM pulse P1 and the second PWM pulse P2 during the charge mode. During the pulse cycle T, the "H" time TP1 of the first PWM pulse P1 (i.e. its ON width) is greater than or equal to 50%, and conversely the "H" time TP2 of the second PWM pulse P2 (i.e. its ON width) is less than or equal to 50%. Dead times Td1 and Td2 are provided in order for the first PWM pulse P1 and the second PWM pulse P2 not to overlap. As described above, these dead times Td1 and Td2 are created by the combination of the second CR time constant circuit 13D and the waveform shaping circuit (the gate circuit and so on) within the drive circuit 13, and the combination of the first CR time constant circuit 14D and the waveform shaping circuit (the gate circuit and so on) within the drive circuit 14.

Figure 3:
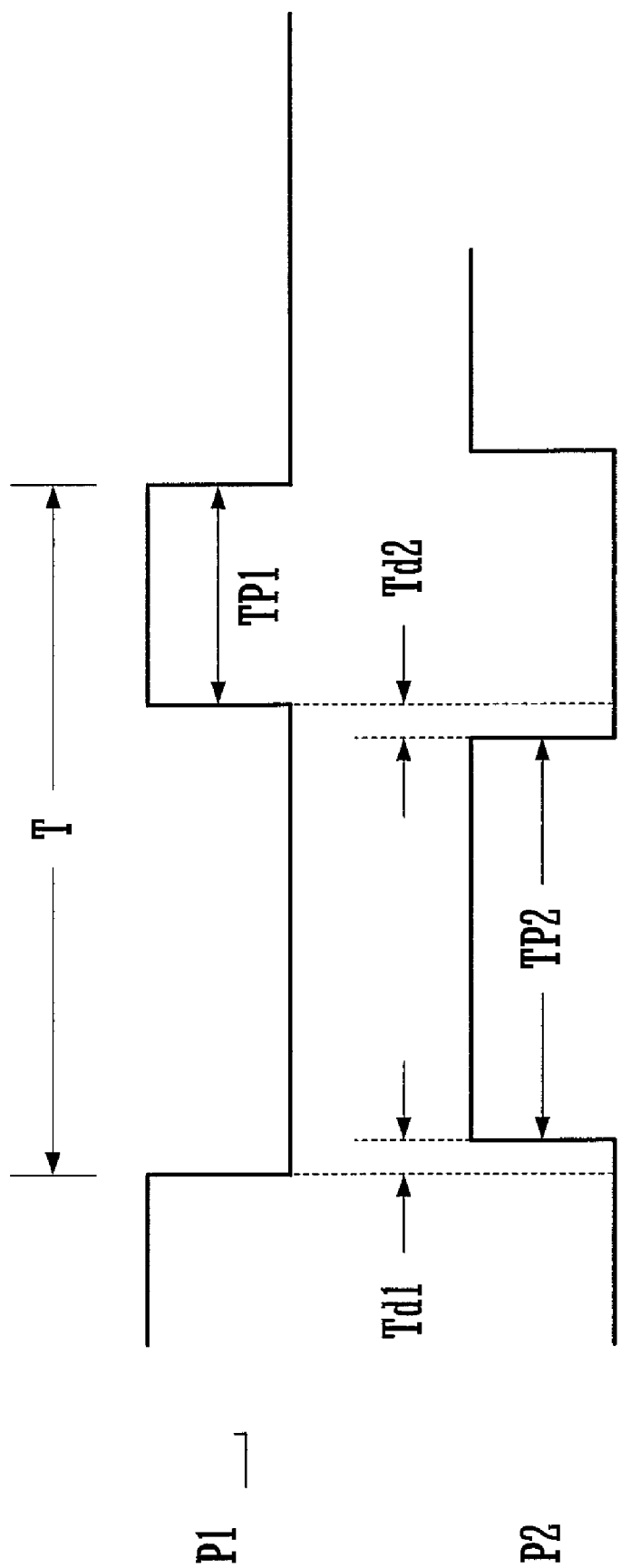
FIG. 3 shows the first PWM pulse P1 and the second PWM pulse P2 during a discharge mode.

FIG. 3 shows the first PWM pulse P1 and the second PWM pulse P2 during the discharge mode. During the pulse cycle T, the "H" time TP1 of the first PWM pulse P1 (i.e. its ON width) is less than or equal to 50%, and conversely the "H" time TP2 of the second PWM pulse P2 (i.e. its ON width) is greater than or equal to 50%. In this discharge mode as well, dead times Td1 and Td2 are provided in order for the first PWM pulse P1 and the second PWM pulse P2 not to overlap.

When a secondary battery 10 which is not charged is connected to the output terminals 9 and the charge/discharge device is started, first the system goes into the charge mode, and the control unit 11 generates the switching pulse signal W1 while setting its duty ratio so that the output current (the charging current) reaches a predetermined constant current. And the first drive circuit 14 and the second drive circuit 13 respectively generate the first PWM pulses P1 and the second PWM pulses P2. In the charge mode, as shown in FIG. 2, a constant current is maintained by the pulse width (the ON width) TP1 being controlled to be larger (wider) and the pulse width (the ON width) TP2 being controlled to be smaller (narrower). Due to the progression of charging, the battery voltage rises, and according thereto the pulse width (the ON width) TP1 becomes smaller. When the output voltage at the output terminals 9 reaches a predetermined voltage, this is taken as being the end of the charging process, and operation in the charge mode is stopped. It should be understood that, in the charge mode, it is possible to test the capacity of the secondary battery 10 by measuring the time period from the start of charging until its end. The end of charging is determined by detecting that the output voltage Vo has reached the predetermined voltage.

When performing a test in the discharge mode, the control unit 11 generates the switching pulse signal W1 while setting its duty ratio so that the output current in the direction of the DC power supply unit 2 (i.e. the discharge current) becomes a predetermined constant current. And the first drive circuit 14 and the second drive circuit 13 respectively create the first PWM pulses P1 and the second PWM pulses P2 from this switching pulse signal W1. In the discharge mode, as shown in FIG. 3, a constant current is maintained by the pulse width (the ON width) TP1 being controlled to be smaller (narrower) and the pulse width (the ON width) TP2 being controlled to be larger (wider) (in this case the direction of the current is towards the DC power supply unit 2). Due to the progression of charging, the battery voltage drops, and according thereto the pulse width (the ON width) TP1 also becomes smaller.

With the charge/discharge device of this embodiment, as will be described hereinafter, in the discharge mode, the frequency f of the switching pulse signal W1 is gradually reduced in response to the pulse width TP1 of the first PWM pulses P1 becoming shorter, in other words in response to the voltage of the battery becoming lower. It should be understood that it would also be acceptable to detect the battery voltage from the output voltage Vo appearing at the output terminals 9, or to detect, as a voltage instead of the output voltage Vo, the smoothed output voltage Vc which is the output voltage of the smoothing filter circuit 6. In this case, the drop in voltage due to the impedance from the output terminals 9 to the smoothing filter circuit 6 should be considered.

By performing control in this manner, in the discharge mode, when the pulse width TP1 of the first PWM pulses P1 has become small, the pulse formation is prevented from becoming unstable.

In the following, this matter will be explained in greater detail.

In order to facilitate understanding, first, the operation of the drive circuits 13 and 14 when the frequency f of the switching pulse signal is fixed will be explained with reference to FIG. 4.

Figure 4:
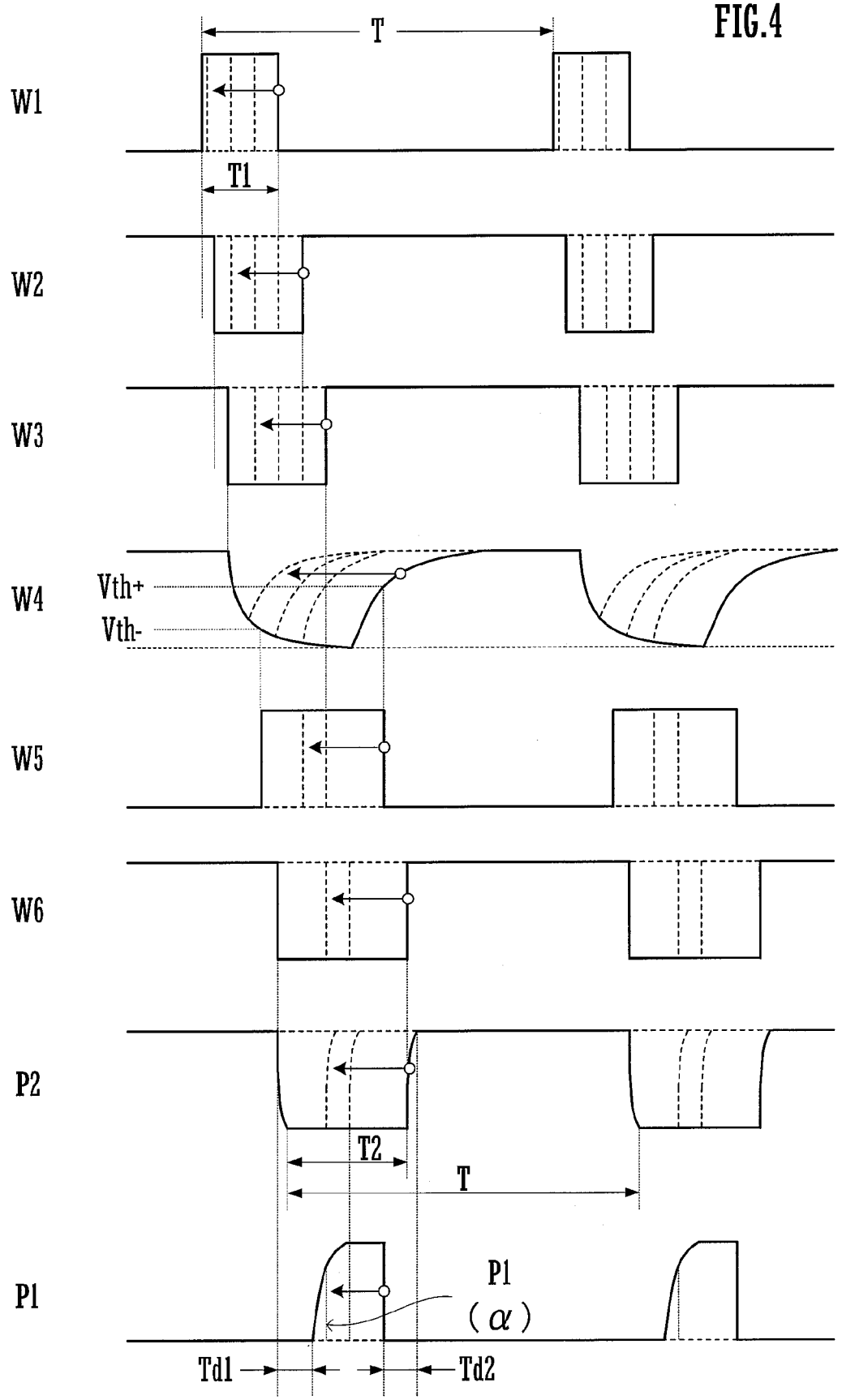
FIG. 4 is a waveform diagram when a battery voltage progressively decreases during the discharge mode.

FIG. 4 is a waveform diagram showing the situation when, in the state with the frequency f of the switching pulse signal fixed, the battery voltage in the discharge mode progressively decreases. The solid line shows the state when the battery voltage is high, and the dotted lines show states when the battery voltage is low. As shown by the arrow signs in FIG. 4, according to progressive decrease of the battery voltage, the pulse width of each of the pulses, including that of the switching pulse signal W1, changes from the state shown by the solid line to the states shown by the broken lines.

The switching pulse signal W1 which is outputted from the terminal PWMO of the control unit 11 is inverted by the signal inversion circuit (i.e. the inverter) 12, and is inputted to the second drive circuit 13. In the second drive circuit 13, the pulses which have been inverted by the signal inversion circuit (inverter) 12 pass through the AND gate 13A, which performs logical multiplication with the input signal which normally is set to "H", and are inputted to the second CR time constant circuit 13D. Although a small signal delay is created due to each of the circuits having a hysteresis characteristic, this delay is not extremely large. By contrast since, as shown by the pulses W4 in FIG. 4, in the second CR time constant circuit 13D, the edge of the switching pulse signal is blunted in an analog manner, due to the waveform shaping in which it is compared with the threshold values Vth+ and Vth−, accordingly the delay of the signal in this circuit 13D is comparatively large (as shown by W4 and W5). The pulses W4, which are the output of the second CR time constant circuit 13D, pass through the signal inversion circuits 13B and 13C, and are inputted to the gate terminal of the second switching element 5 as the second PWM pulses P2. These second PWM pulses P2 are inputted to the gate terminal of the second switching element 5, and drive this switching element 5 to turn ON and OFF.

On the other hand, the switching pulse signal W1 is also inputted to the first drive circuit 14 not via any signal inversion circuit, and, in this first drive circuit 14, the first PWM pulses P1 are created by the first CR time constant circuit 14D and the signal inversion circuit which performs waveform shaping and so on. These first PWM pulses P1 are inputted to the gate terminal of the first switching element 4, and drive this switching element 4 to turn ON and OFF.

The dead times Td1 and Td2 are created by the drive circuits 13 and 14 according to the above operation.

Furthermore, in the discharge mode, the control unit 11 reduces the duty ratio (T1/T) of the switching pulse signal so as to attain a constant current. When the duty ratio of the switching pulse signal W1 becomes small, the pulses W2 and W3 whose signal levels are inverted by the signal inversion circuit 12 are created, and moreover the pulse W3 is converted by the second CR time constant circuit 13D into the signal W4 whose waveform is blunted (a blunted signal). The signal W4 is waveform shaped by the signal inversion circuit 13B which performs waveform shaping.

However, as shown in FIG. 4, since this signal which has been blunted is waveform shaped according to the normal threshold value of the IC, therefore, in correspondence to the duty ratio of the switching pulse signal W1 becoming smaller, the pulse width of the pulses W5 (their ON width) which have been waveform shaped from the signal W4 abruptly becomes smaller (i.e. becomes narrower). Due to this the pulse width of the second PWM pulses P2, which result from the pulses W5 after a further inversion, abruptly becomes greater (wider) according to the duty ratio of the switching pulse signal W1 becoming smaller. At this time, the pulse width of the first PWM pulses P1 (their ON width) abruptly becomes smaller (narrower) according to the duty ratio of the switching pulse signal W1 becoming smaller. In FIG. 4, it is shown that the situation arises in which, as a result of the pulse width of the first PWM pulses P1(α) abruptly becoming smaller (narrower), it is not possible to ensure a sufficient peak value. This type of first PWM pulses P1(α) cannot be termed normal pulses, and moreover the first switching element 4 cannot be turned ON. Due to this, the discharge current comes to pass through the diode 40.

On the other hand, when the duty ratio of the switching pulse signal W1 becomes small and the blunted signal W4 exceeds the threshold value Vth, then it becomes impossible to drive the signal inversion circuits 13B and 13C, and it becomes impossible to form the OFF section of the second PWM pulses P2. When this happens, the second switching element 5 remains ON continuously, and due to this there is a possibility that an interval will occur in which it is not possible to control this switching element 5.

The fact that the above described pulse width (ON width) abruptly becomes narrower means that the change of ΔTx/ΔTy becomes abrupt.

However, ΔTx specifies the change of the duty ratio (T2/T) of the second PWM pulses P2, and ΔTy specifies the change of the duty ratio (T1/T) of the switching pulse signal W1.

Moreover, when the fact that the change of ΔTx/ΔTy becomes abrupt is expressed in terms of change of the output voltage and change of the gain, the following conclusions result.

Figure 5:
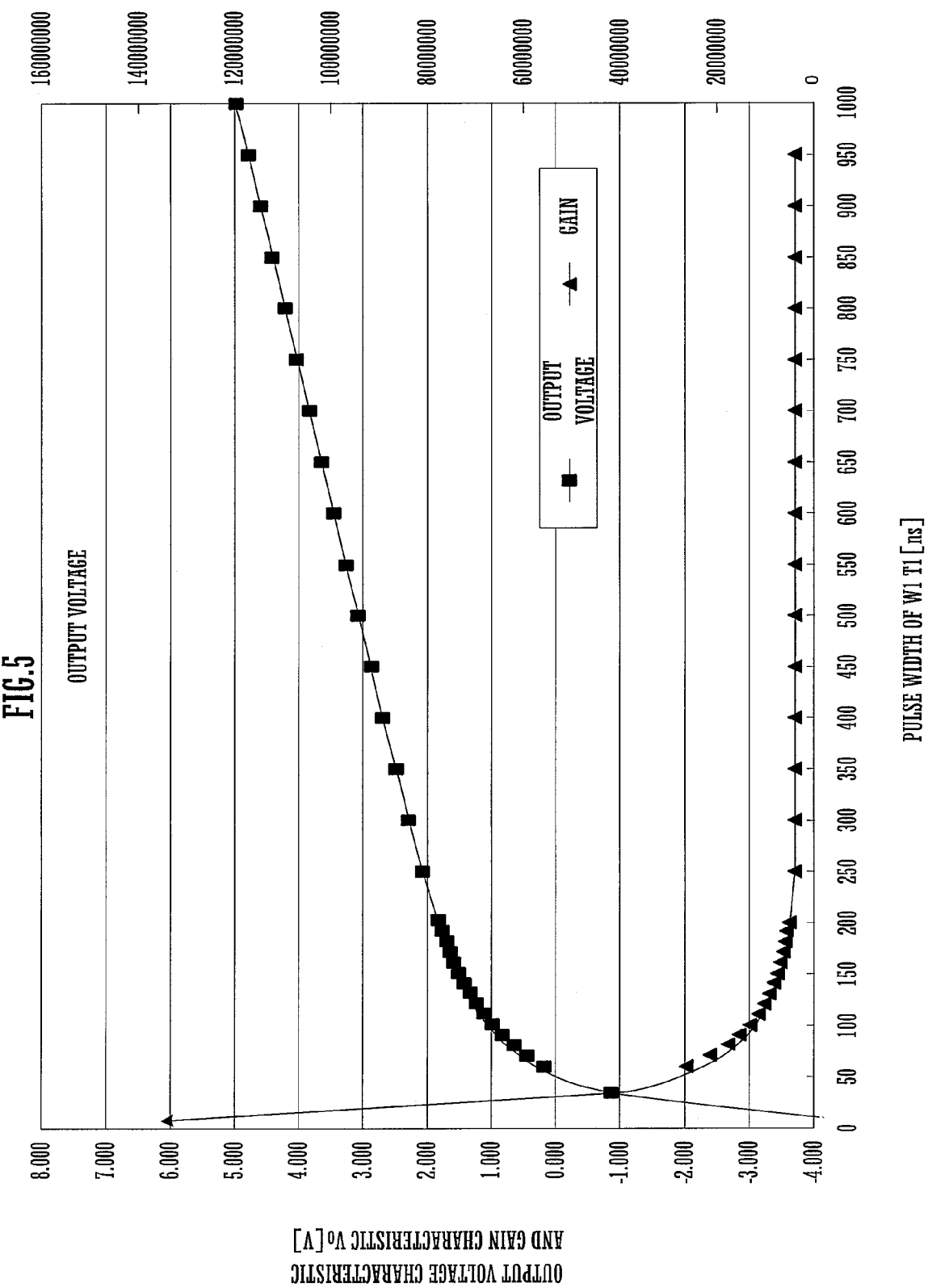
FIG. 5 is a figure showing the change of output voltage Vo and gain G.

FIG. 5 is a figure showing change of the output voltage Vo and change of the gain G, with the output voltage Vo being shown along the vertical axis and the pulse width T1 of the switching pulse signal W1 being shown along the horizontal axis.

The gain G is given by:

(output voltage change ΔV)/(pulse width change ΔT) (Eqn. 1)

And the change of the output voltage is:

{the output voltage Vo(t) when the pulse width of the pulses W1 is T1(t)}−{the output voltage Vo(t−1) for pulse width of the pulses W1 is T1(t−1)} while the change of the pulse width is:

{pulse width T1(t)−pulse width T1(t−1)}

As shown in FIG. 5, it will be understood that, when the output voltage Vo becomes low (i.e. when the pulse width of W1 becomes small), the gain G increases abruptly. In other words it is shown that, when the output voltage Vo is low (i.e. when the gain G is changing abruptly), then the control by the control unit 11 becomes unstable, since the change of the gain G of the control system is large.

As described above, if the frequency f of the switching pulse signal W1 is fixed, and the duty ratio of the switching pulse signal W1 is controlled in the discharge mode, then the control becomes unstable when the output voltage Vo has become low (i.e. when the pulse width (the ON width) of W1 has become small), and inconveniences arise such as that the OFF section of the second PWM pulse P2 is not created, and the like.

Thus, with the charge/discharge device of this embodiment, in the discharge mode, the frequency f of the switching pulse signal W1 is progressively lowered in correspondence to the OFF width of the second PWM pulses P2 becoming short (in FIG. 3, TP2 becomes long), in other words in correspondence to the output voltage Vo (the smoothed output voltage Vc) becoming low. When the frequency of the switching pulse signal W1 is reduced, the change of the gain G of the control system by the control unit 11 becomes more gentle, and it is possible to eliminate the control instability. In other words, in (Eqn. 1), by reducing the frequency f, it is possible to lower the gain G, since it is possible to increase the (change ΔT of the pulse width) without changing the (change ΔV of the output voltage). Thus, by reducing the gain G, it is possible to suppress the above described abrupt changing.

Figure 6:
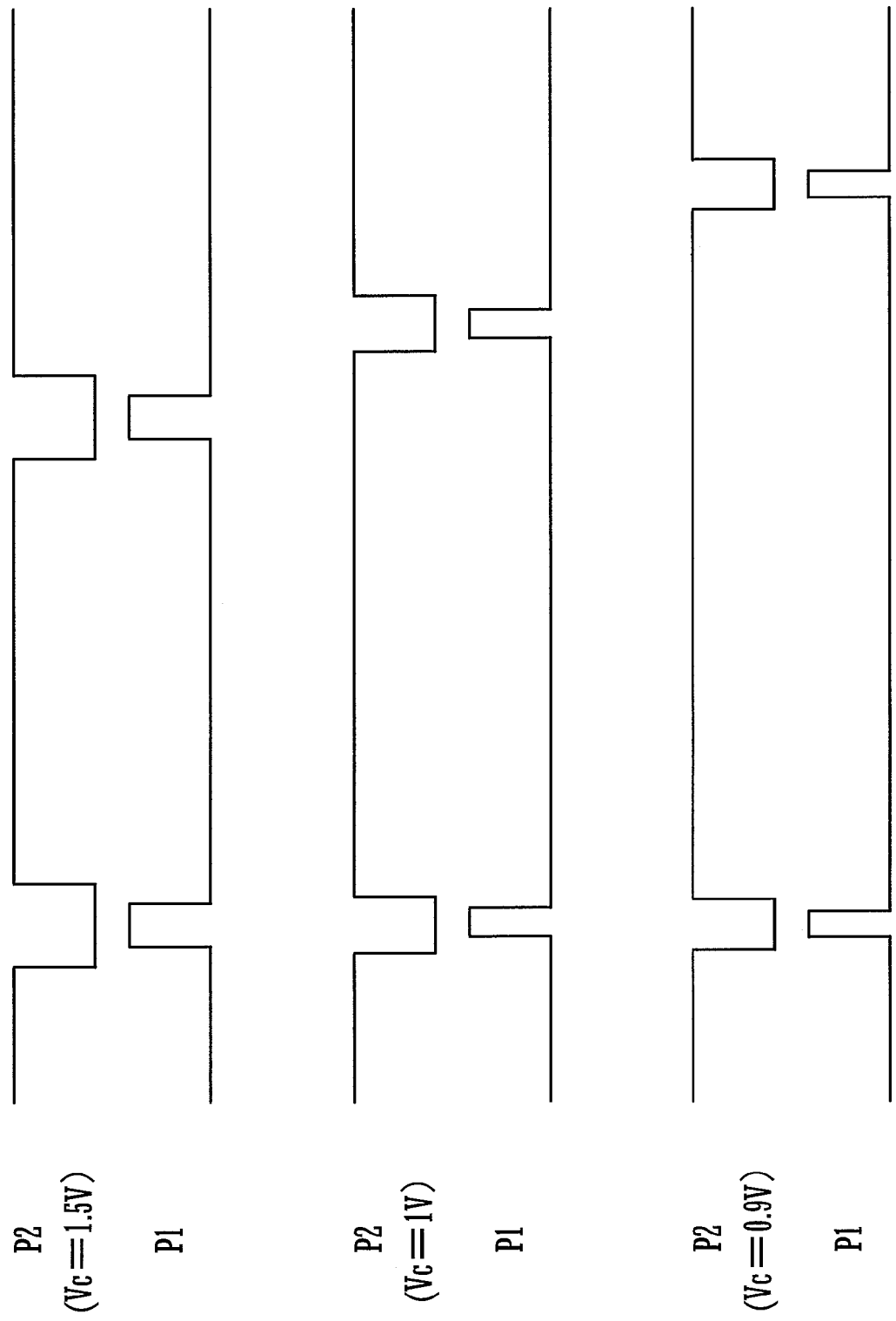
FIG. 6 shows the changes of the first PWM pulse P1 and the second PWM pulse P2 when the frequency of switching pulses W1 progressively decreases.
Figure 7:
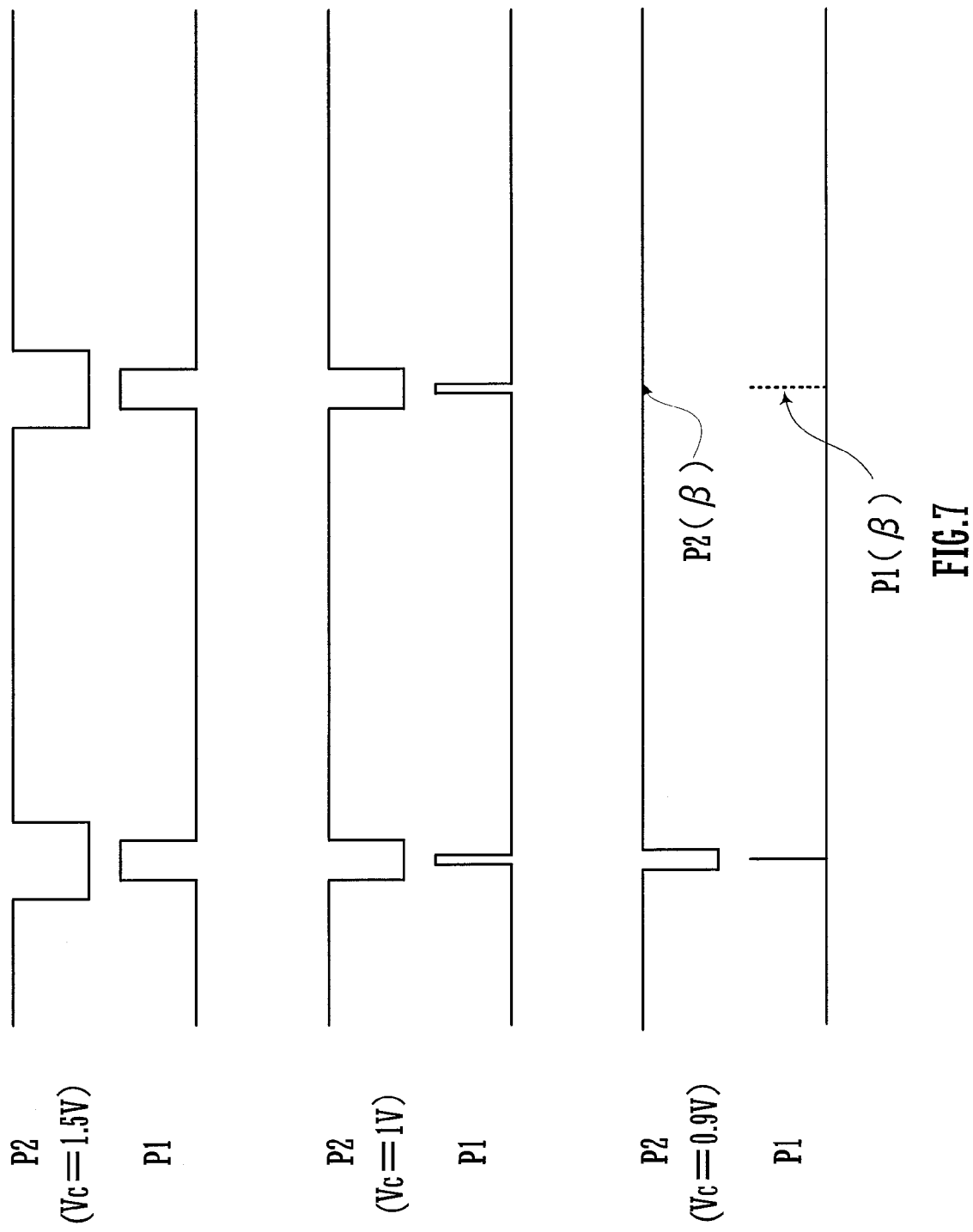
FIG. 7 shows the changes of these pulses P1 and P2 if the frequency f is fixed.

FIG. 6 shows the change of the first PWM pulses P1 and the second PWM pulses P2 when, in the discharge mode, the frequency of the switching pulse signal W1 has been lowered by the control unit 11. And, for comparison, FIG. 7 shows the change of these pulses P1 and P2 when the frequency f is kept fixed. It should be understood that, in FIGS. 6 and 7, the smoothed output voltage Vc being in the vicinity of 1 V is equivalent to the battery voltage of the secondary battery 10 (a lithium ion battery) abruptly dropping to the vicinity of 3 V. And the difference of 2 V between these voltages corresponds to the drop in voltage due to the wiring from the smoothing filter circuit 6 to the secondary battery 10.

As shown in FIG. 7, if the frequency f is fixed, when the smoothed output voltage drops as far as Vc=0.9 V, the OFF section of the second PWM pulses P2 becomes extremely narrow in width, and it becomes impossible for the second PWM pulses P2 to go to OFF, as shown by P2(β). In this case, it may happen that the pulses become lost due to this OFF section disappearing, so that the OFF section becomes as it were "a line", and normal operation does not take place. Simultaneously, pulse loss as shown by P1(β) also occurs in the first PWM pulses as well. Moreover, there is a possibility that pulse loss or the like may take place during the charge mode as well.

By contrast when, as shown in FIG. 6, the frequency f is reduced according to decrease in the smoothed output voltage Vc, then, it is possible for the second PWM pulses P2 to go OFF even if the smoothed output voltage Vc decreases as far as 0.9 V, and it is possible to control the second switching element 5 correctly with the second PWM pulses P2. With regard to the first PWM pulses P1 as well, occurrence of pulse loss disappears. Moreover, instabilities such as "a line" pulses also do not occur.

Figure 8:
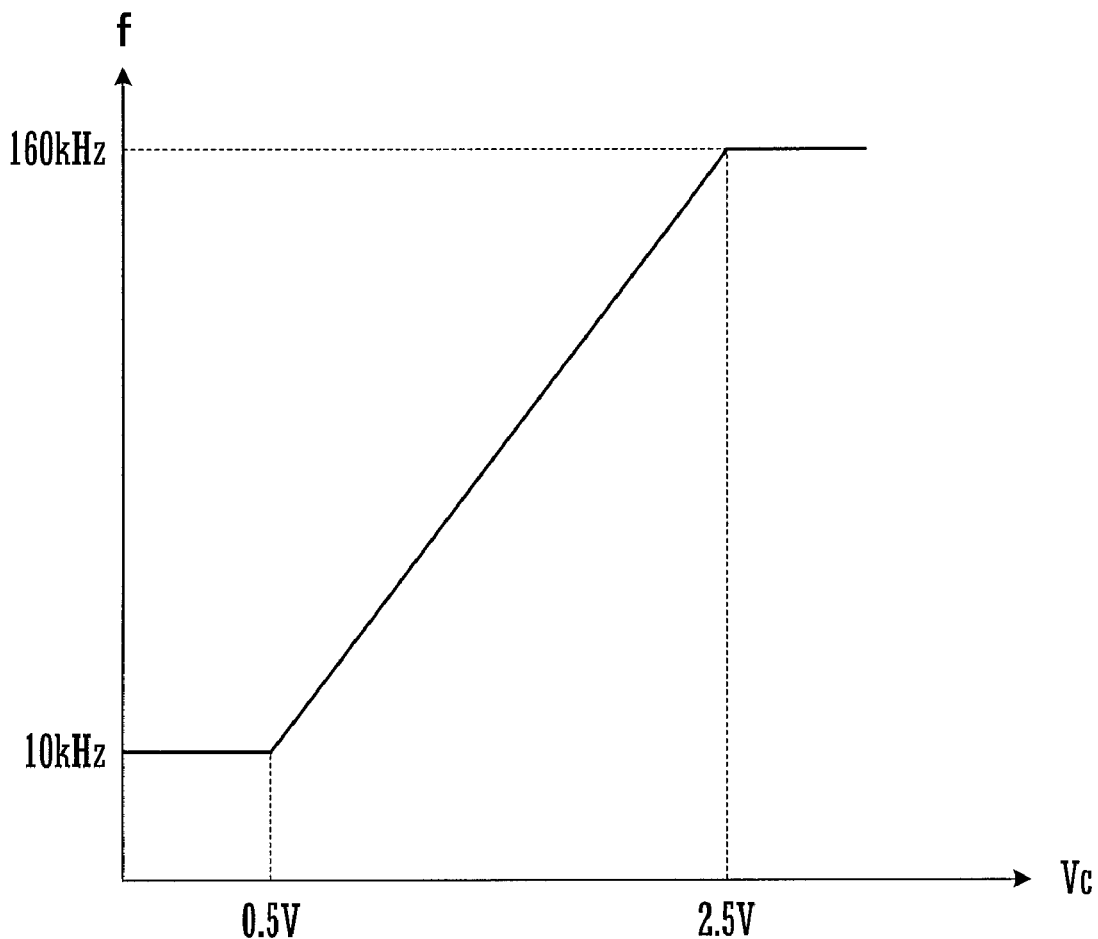
FIG. 8 shows the control characteristics of the switching frequency f.

FIG. 8 shows the control characteristics of the switching frequency f.

As shown in FIG. 8, in the discharge mode, the frequency f is set to 160 kHz until Vc drops to 2.5 V, and thereafter the frequency f is gradually reduced until Vc drops to 0.5 V.

Figure 9:
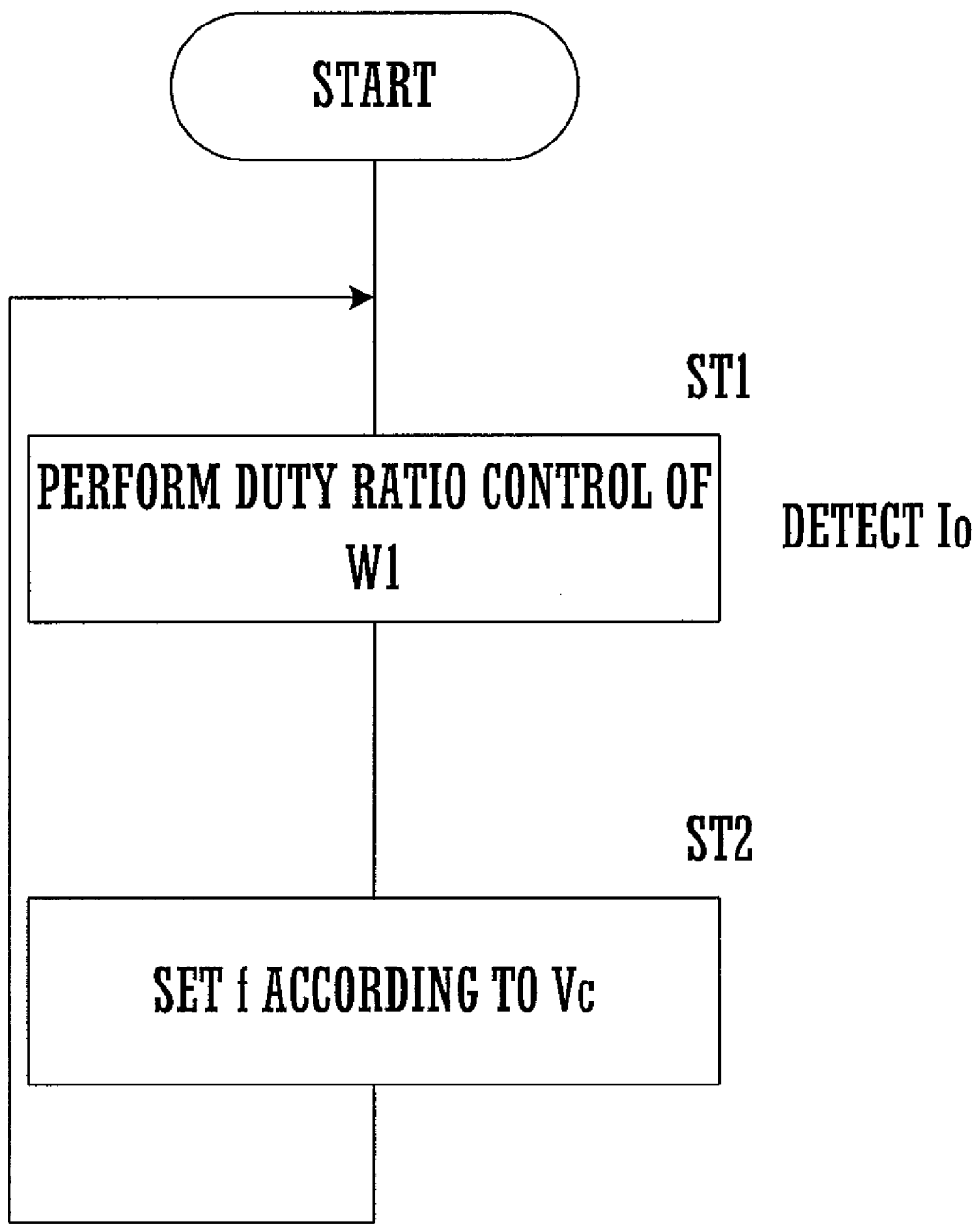
FIG. 9 is a flow chart showing the operation of a control unit 11 during the discharge mode.

FIG. 9 is a flow chart showing the operation of the control unit 11 during the discharge mode.

In a step ST1, the control unit 11 controls the duty ratio of the switching pulse signal W1 so that the discharge current is constant, and then in a step ST2 it refers to a function which specifies the characteristic of FIG. 8 which is stored in advance, and sets the frequency f according to the smoothed output voltage Vc. In this step ST2, constant current control is performed even though the frequency f changes. If the control unit 11 comprises a CPU, the characteristic of FIG. 8 may be stored as a table, and the frequency f may be set according to the smoothed output voltage Vc by reference to this table.

As described above, since, by progressively reducing the frequency f of the switching pulse signal W1 according to decrease of the smoothed output voltage Vc, it is possible to ensure that the OFF section of the second PWM pulses P2 is created, accordingly it is possible to prevent the pulse formation of the second PWM pulses P2 from becoming unstable. It should be understood that since, by progressively reducing the frequency f of the switching pulse signal W1, the pulse width TP1 of the first PWM pulses P1 also becomes greater (wider), accordingly the formation of these pulses also does not become unstable.

It should be understood that it is possible to prevent the pulse formation of the first PWM pulses P1 and the second PWM pulses P2 becoming unstable by performing the same type of control, not only during the discharge mode, but also during the charge mode as well. In other words, during the charge mode, when the amount of charge to the secondary battery 10 is low, the OFF width of the first PWM pulses P1 is small, but at this time, if the voltage decreases for some reason, then this OFF width becomes yet shorter and the formation of the first PWM pulses P1 becomes unstable. Thus the frequency f of the switching pulse signal W1 is controlled to drop according to the OFF width of the first PWM pulses P1 becoming short, in other words as the smoothed output voltage Vc becomes high.

Moreover although, in the above embodiment, as shown in FIG. 8, the frequency f of the switching pulse signal is continuously changed according to the magnitude of the smoothed output voltage Vc of the smoothing filter circuit 6, it would also be acceptable to arrange for the frequency f to be changed (during the discharge mode) when the smoothed output voltage Vc has decreased to a constant voltage value. In other words, it would also be acceptable to arrange to reduce the frequency f (during the discharge mode) when the smoothed output voltage Vc has decreased to a level at which the pulse width of the first PWM pulses P1 abruptly becomes shorter.

Furthermore, although constant current control was performed in the above embodiment, it would also be possible to perform constant voltage control in which the smoothed output voltage Vc is kept constant.

Moreover, apart from being applied as above to a test device for a secondary battery 10, the present invention can also be applied to an electronic load device. In the case of such an application to an electronic load device, a power supply unit which is capable of inputting and outputting current is connected to the output terminals 9, and it functions as an electronic load into which a constant current flows from that power supply unit, or which flows a constant current to that power supply unit.

What is claimed is:

1. A power supply device, comprising:
   a series circuit of a first switching element and a second switching element, connected in parallel with a DC power supply unit;
   a smoothing filter circuit comprising a series circuit of an inductor and a smoothing capacitor, connected in parallel with said second switching element;
   output terminals which are connected to the two sides of said smoothing capacitor;
   a control unit which outputs a switching pulse signal, and controls the duty ratio thereof; and
   a drive circuit which, based upon said switching pulse signal, generates first PWM pulses and second PWM pulses for turning said first switching element and said second switching element alternatingly ON and OFF respectively, and which moreover creates a dead time between these PWM pulses;
   and wherein said control unit changes the frequency of said switching pulse signal corresponding to the pulse width of either said first PWM pulses or said second PWM pulses.

2. A power supply device according to claim 1, wherein said control unit reduces the frequency of said switching pulse signal corresponding to shortening of the pulse width of either said first PWM pulses or said second PWM pulses.

3. A power supply device according to claim 1, wherein said control unit reduces the frequency of said switching pulse signal when the pulse width of either said first PWM pulses or said second PWM pulses becomes less than or equal to a fixed pulse width.

4. A power supply device according to claim 1, wherein said drive circuit comprises a CR time constant circuit which takes the edge off of said switching pulse signal, and said dead time is created by waveform shaping the output of said CR time constant circuit.

5. A power supply device according to claim 4, wherein:
   said drive circuit comprises a first drive circuit which generates said first PWM pulses and a second drive circuit which generates said second PWM pulses;
   said first drive circuit comprises a first CR time constant circuit which takes the edge off said switching pulse signal;
   said second drive circuit comprises a second CR time constant circuit which takes the edge off said switching pulse signal; and
   the respective time constants of said first CR time constant circuit and said second CR time constant circuit are different.

6. A power supply device according to claim 1, further comprising an output current detection unit which detects output current, and wherein said control unit controls the duty ratio of said switching pulse signal so that the output current detected by said output current detection unit is constant.

7. A power supply device according to claim 6, wherein:
   said output terminals are connected to a secondary battery;
   said control unit can set a charge mode in which a charging current is flowed to said secondary battery, and a discharge mode in which a discharge current is flowed out from said secondary battery; and
   during said charge mode, the duty ratio of said switching pulse signal is controlled so that the pulse width of said first PWM pulses becomes greater than the pulse width of said second PWM pulses, and, during said discharge mode, the duty ratio of said switching pulse signal is controlled so that the pulse width of said second PWM pulses becomes greater than the pulse width of said first PWM pulses.

8. A power supply device according to claim 7, wherein said control unit controls the duty ratio of said switching pulse signal in correspondence to the battery voltage of said secondary battery.

9. A charge/discharge device, comprising:
a series circuit of a first switching element and a second switching element, connected in parallel with a DC power supply unit;
a smoothing filter circuit comprising a series circuit of an inductor and a smoothing capacitor, connected in parallel with said second switching element;
output terminals which are connected to the two sides of said smoothing capacitor, and to which a second battery which is to be charged and discharged for testing is connected;
a control unit which outputs a switching pulse signal, and which controls the duty ratio thereof; and
a drive circuit which, based upon said switching pulse signal, generates first PWM pulses and second PWM pulses for turning said first switching element and said second switching element alternatingly ON and OFF respectively, and which moreover creates a dead time between these PWM pulses;
and wherein, during discharge of said secondary battery, said control unit lowers the frequency of said switching pulse signal corresponding to the OFF width, at which said second switching element is turned OFF by said second PWM pulses, becoming shorter.

10. A charge/discharge device according to claim 9, wherein said drive circuit comprises a CR time constant circuit which takes the edge off of said switching pulse signal, and said dead time is created by waveform shaping the output of said CR time constant circuit.

11. A charge/discharge device according to claim 10, wherein:
said drive circuit comprises a first drive circuit which generates said first PWM pulses and a second drive circuit which generates said second PWM pulses;
said first drive circuit comprises a first CR time constant circuit which takes the edge off of said switching pulse signal;
said second drive circuit comprises a second CR time constant circuit which takes the edge off of said switching pulse signal; and
the respective time constants of said first CR time constant circuit and said second CR time constant circuit are different.

12. A charge/discharge device according to claim 9, further comprising an output current detection unit which detects output current, and wherein said control unit controls the duty ratio of said switching pulse signal so that the output current detected by said output current detection unit is constant.

13. A charge/discharge device according to claim 12, wherein said control unit controls the duty ratio of said switching pulse signal in correspondence to the battery voltage of said secondary battery.

14. A charge/discharge device, comprising:
a series circuit of a first switching element and a second switching element, connected in parallel with a DC power supply unit;
a smoothing filter circuit comprising a series circuit of an inductor and a smoothing capacitor, connected in parallel with said second switching element;
output terminals which are connected to the two sides of said smoothing capacitor, and to which a second battery which is to be charged and discharged for testing is connected;
a control unit which outputs a switching pulse signal, and which controls the duty ratio thereof; and
a drive circuit which, based upon said switching pulse signal, generates first PWM pulses and second PWM pulses for turning said first switching element and said second switching element alternatingly ON and OFF respectively, and which moreover creates a dead time between these PWM pulses;
and wherein, during discharge of said secondary battery, said control unit lowers the frequency of said switching pulse signal when the OFF width at which said second switching element is turned OFF by said second PWM pulses shortens to less than or equal to a fixed pulse width.

15. A charge/discharge device according to claim 14, wherein said drive circuit comprises a CR time constant circuit which takes the edge off of said switching pulse signal, and said dead time is created by waveform shaping the output of said CR time constant circuit.

16. A charge/discharge device according to claim 15, wherein:
said drive circuit comprises a first drive circuit which generates said first PWM pulses and a second drive circuit which generates said second PWM pulses;
said first drive circuit comprises a first CR time constant circuit which takes the edge off of said switching pulse signal;
said second drive circuit comprises a second CR time constant circuit which takes the edge off of said switching pulse signal; and
the respective time constants of said first CR time constant circuit and said second CR time constant circuit are different.

17. A charge/discharge device according to claim 14, further comprising an output current detection unit which detects output current, and wherein said control unit controls the duty ratio of said switching pulse signal so that the output current detected by said output current detection unit is constant.

18. A charge/discharge device according to claim 17, wherein said control unit controls the duty ratio of said switching pulse signal according to the battery voltage of said secondary battery.

* * * * *